United States Patent [19]

Schnedecker

[11] 4,426,762
[45] Jan. 24, 1984

[54] METHOD FOR SELECTIVELY OBTURATING AT LEAST ONE END OF A STRUCTURAL MODULE

[75] Inventor: Guy Schnedecker, Paris, France

[73] Assignee: Commissariat a l'Energie Atomique, Paris, France

[21] Appl. No.: 178,009

[22] Filed: Aug. 14, 1980

[30] Foreign Application Priority Data

Aug. 28, 1979 [FR] France ............................... 79 21542

[51] Int. Cl.$^3$ .......................................... B22D 11/126
[52] U.S. Cl. ..................................... 29/527.4; 29/530; 29/527.6; 29/157.3 R; 29/DIG. 39; 228/261; 228/183
[58] Field of Search ............. 29/DIG. 39, 550, 527.1, 29/527.2, 527.4, 527.6, 157.3 R, 423, 424, 458, 157.4, 527.3, 527.5; 288/201, 183, 181

[56] References Cited

U.S. PATENT DOCUMENTS

| | | | |
|---|---|---|---|
| 1,323,167 | 11/1919 | Denny | 29/530 X |
| 1,671,620 | 5/1928 | von Marchthal | 29/DIG. 39 |
| 2,222,058 | 11/1940 | McMullen et al. | 29/DIG. 39 |
| 3,885,942 | 5/1975 | Moore | 65/33 |
| 3,926,251 | 12/1975 | Pei | 165/165 |
| 4,041,592 | 8/1977 | Kelm | 29/157.3 R |

FOREIGN PATENT DOCUMENTS 2149458 3/1973 France .

Primary Examiner—Howard N. Goldberg
Assistant Examiner—V. K. Rising
Attorney, Agent, or Firm—Pearne, Gordon, Sessions, McCoy, Granger & Tilberry

[57] ABSTRACT

A method for selectively obturating at least one end of a structural module provided with rows of parallel ducts for the passage of at least two different fluids, said method comprising the steps of forming notches in those portions of the module end corresponding to the rows through which flows a first one of said fluids, said notches forming openings through the lateral wall of said module, and depositing an impervious material over the end of said module, so as to obturate the ducts through which the other fluid or fluids flow, while laterally leaving free access, by means of said notches, to the ducts through which flows said first fluid, said impervious material being sprayed in a liquid state, then gradually cooled, the angle at which it is sprayed being between 18° and 30° with respect to the direction of the ducts. According to alternative embodiments of the invention, the step of forming notches in the module can be removed and replaced by one of machining off the layer deposited over the portions of the module end corresponding to the rows through which flows the first fluid or by one of locating masks in front of these portions of the module end during the step of depositing the material over the end of the module.

12 Claims, 3 Drawing Figures

METHOD FOR SELECTIVELY OBTURATING AT LEAST ONE END OF A STRUCTURAL MODULE

The present invention relates to a method for selectively obturating at least one end of a structural module.

Quite a number of industrial plants make use of structural modules provided with rows of parallel ducts through which at least two different fluids are caused to flow. Such installations are to be found in particular in heat-exchangers and also in ultrafiltration units.

Whatever be their application, the structural modules of that type have all in common the fact that they comprise adjacent ducts through which flow different fluids, so that the need of separating said fluids make it necessary to carry out a selective obturation of the modules. The effect of such a selective obturation is to obturate one end of each of the ducts through which flows one of the fluids, while allowing another fluid flowing through other ducts to pass through orifices made in the respective module, in the vicinity of said end.

While various solutions to that problem have already been suggested, such solutions usually resort to intricate methods consisting, e.g., in connecting parallel spaced tubes defining rows of ducts, with partitions of smaller length, so as to form, between said partitions and the tube outer walls, other rows of ducts that are laterally open at the level of the shorter ends of said partitions. In view of their intricacy, such solutions are costly and moderately reliable.

One object of the present invention is precisely to provide modules of the above type according to a substantially simpler and more reliable method.

More specifically, the object of the present invention is to provide a method for selectively obturating at least one end of a structural module provided with rows of parallel ducts for the passage of at least two different fluids, said method comprising a step of allowing free access to the rows of ducts through which flows a first one of said fluids, and a step of depositing an impervious material over the end of said module, said impervious material being sprayed in a liquid state and intermittently, thereby defining short projection periods separated by longer cooling periods, the angle at which it is sprayed being between 18° and 30° with respect to the direction of the ducts.

According to a first variant of the invention, free access to the rows of ducts through which flows the first fluid is obtained by forming notches in those portions of the module end corresponding to said rows before depositing the impervious material, said notches forming openings through the lateral wall of the module, hence leaving a lateral free access to the ducts through which flows the first fluid, while the other ducts are obturated by the impervious material.

According to a second variant of the invention, the free access to the rows of ducts through which flows the first fluid is obtained by machining off by electro-erosion or by means of a laser (for example), the layer of impervious material deposited on these rows of ducts.

According to a third variant of the invention, the free access to the rows of ducts through which flows the first fluid is obtained by preventing the impervious material from depositing on said front portion by locating masks in front of these rows of ducts.

Quite obviously, such a method makes it possible to obtain the selective obturation desired in a very simple manner. In the first variant, the depth of the ducts can even be modulated according to the size of the lateral openings required for the contemplated application. The projection in a liquid state resorted to so-called schooping or Schoop process, can be achieved in particular by means of an oxyacetylene blowpipe. It is imperative to spray the impervious material at an angle to the direction of the ducts Indeed, it is thus possible in the first variant to restrict the penetration of said impervious material into the notches as much as possible and to maintain the depth of said notches appropriately large. Furthermore, the risk of obturating and rupturing the walls is thus reduced since the mechanical shock caused by the projection is restricted. In the same way, the intermittent projection permanently eliminates during the cooling periods the heat arising out of the projection periods. The problems raised by the difference between the coefficients of expansion of the module and the sprayed material are thus avoided.

According to a preferred embodiment of the first variant of the invention, the width of the notches is substantially equal to the inner width of the ducts. The notches can be machined by means of an appropriate tool, the width of which is smaller than the inner width of the respective ducts. Preferably, said ducts are of square or rectangular cross-section.

The impervious material for obturating one end of the module can be selected from the group comprising metal oxides such as alumina, metals such as aluminium or nickel, and mixtures thereof.

Again, the module itself can be made from a material selected from the group comprising sintered or not-sintered mineral materials, and in particular ceramics such as alumina of cordierite and metals such as nickel.

Other features of the present invention will appear from the following description, given merely by way of example, with reference to the accompanying drawing, in which.

Figure 1:
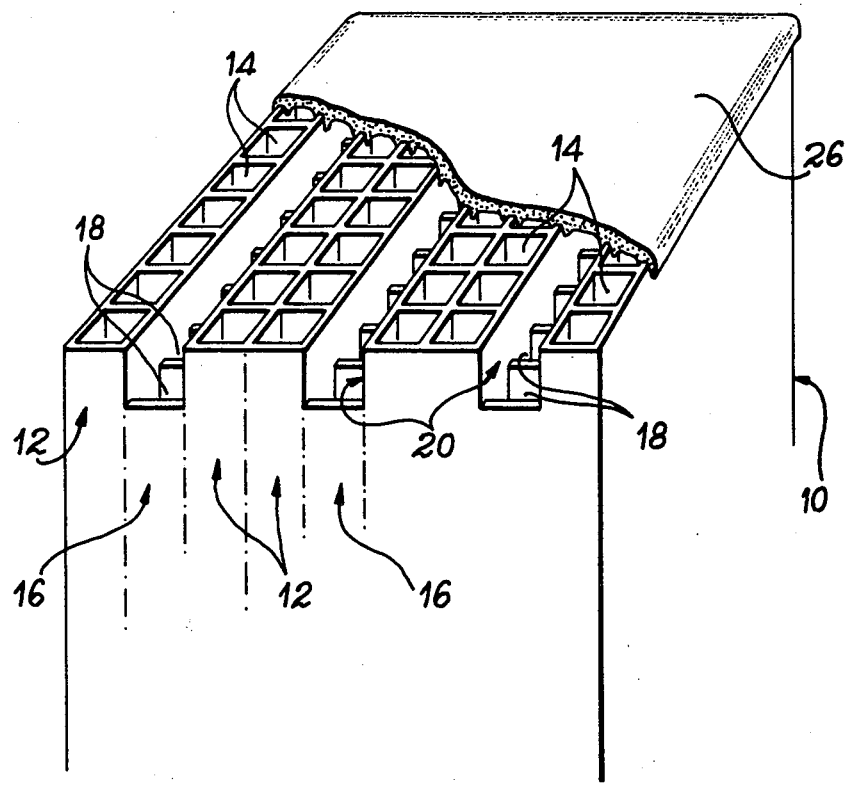
FIG. 1 is an exploded perspective view of a structural module, one end of which has been selectively obturated according to a first variant of the method of the invention.

The structural module such as shown in FIG. 1 generally designated by reference numeral 10 comprises rows 12 of parallel ducts 14 through which flows a first fluid, and rows 16 of parallel ducts 18 through which flows a second fluid. Both ducts 14 and 18 are all parallel and extend along the whole length of module 10, so that they are open at both ends of the latter, prior to the selective obturation step.

As shown in FIG. 1, ducts 14 and 18 are preferably of square or rectangular cross-section, so that they are separated from one another by plane partitions. By way of illustration, it will be noted that the sides of ducts of square cross-section can be from 2 to 3 millimeters long, whereas the thickness of the partitions separating the various ducts can vary between 100 and 200 microns.

The material forming module 10 is selected according to the various requirements of its use, such as a fair resistance to corrosion (in cases where the fluids flowing through the ducts are very corrosive), and, contingently, according to the mechanical and thermal stresses to which said material will be submitted during the step of obturating the ends of the module. To that end, the materials likely to be used for making module 10 are usually selected from mineral materials (either sintered or not), and, more especially, ceramics such as alumina of cordierite (magnesium aluminosilicate) and also from metals such as nickel. Quite obviously, said material can be porous or impervious according as it is adapted either to separate or filter a fluid, or to provide a heat-exchange between two fluids.

According to a first variant of the method according to the invention, notches 20 are first made in those portions of the extremity of module 10 corresponding to rows of ducts 16, in the example shown in FIG. 1. Such notches are made preferably by machining with a tool, the thickness of which is smaller by about 2/10 mm than the inner width of the ducts. Such a tool can be, for instance, a diamond wheel or a saw. Notches 20 can also be made ultrasonically.

Figure 2:
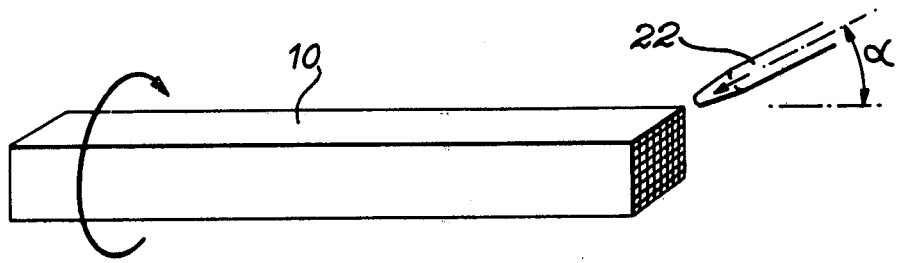
FIG. 2 is a diagrammatic perspective view showing the deposition of an impervious material over the end of a module, said material being sprayed in the liquid state.

Notches 20 permit to select those ducts that will not be obturted during the liquid spray obturation step, so-called "schooping", illustrated in FIG. 2.

During the obturation step proper, module 10 is rotatively driven at a speed in the neighbourhood of e.g. 200 R.P.M., and an impervious obturation material is projected by means of a spray gun 22 over the extremity of module 10 to be obturated.

The impervious material sprayed by means of said gun 22 is selected according to the nature of the material forming module 10, and said impervious material must both meet the requirements for making it possible to achieve the obturation according to the present invention, and meet the requirements required for the contemplated application, and in particular the risks of corrosion in cases where the fluids are very corrosive.

In particular, the ratio of the respective thermal expansion coefficients of the module material and the obturation material should not be too large, its upper limit being dependent on the mechanical strength of the module material, the wall thickness and the module geometry.

Thus, the impervious material sprayed by gun 22 can be either an oxide such as alumina, or a metal such as aluminum or nickel, or else a metal and oxide mixture.

Spray gun 22 can be an oxyacethylene blowpipe, whenever the material to be projected is relatively fusible, which is in particular the case when said material is a metal such as aluminum. A wire of the same metal, the diameter of which varies between 2 mm and 3 mm according to the britleness of module 10, is then introduced into the flame of said blowpipe and molten metal particules are driven away by a compressed air stream. In addition, with the apparatus used, the extremity of the spray gun 22 is placed between 12 to 18 cm from the extremity of the module.

It is also possible to resort to the technique of arc plasma whenever the materials sprayed are only moderately fusible, which is in particular the case with metal oxides of metals having a high melting-point.

As shown in FIG. 2 spray gun 22 is inclined by an angle α between 18° and 30° with respect to the direction of the ducts of module 10, said direction defining the axis of rotation of the latter. Such an inclination permits to restrict the penetration of the impervious material into the notches to a very small amount. The inclination of the gun also permits reduction of the mechanical shocks resulting from the projection.

In the course of the obturation step proper, the projection of the obturation material by means of gun 22 is carried out in an intermittent way, each projection period (lasting about one second maximum) being followed by a cooling period, of longer duration (for example 5 to 10 seconds). This characteristic allows elimination of the greater portion of the heat arising out of the projection period and makes it possible to work out the problems raised by the inadapted coefficients of expansion of both materials.

Figure 3:
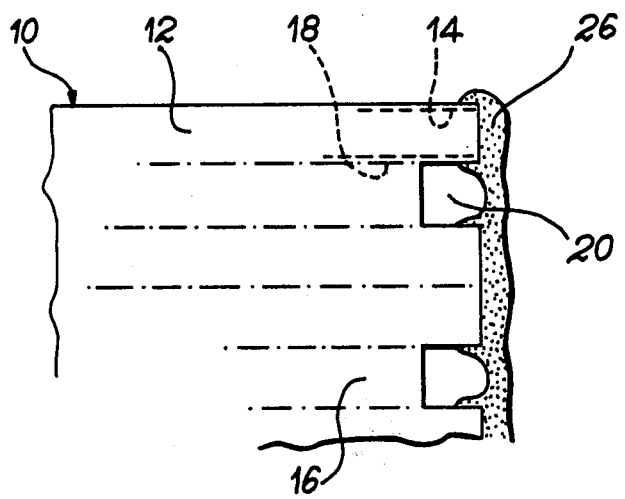
FIG. 3 is an enlarged cross-section of the module end, as it appears once the impervious material has been deposited.

FIG. 3 shows the extremity of module 10 how it appears once it has been obturated by a layer of impervious material 26 projected by means of gun 22. It can be seen that material 26 fully obturates ducts 14 in which no notch has been previously made, and obturates the edges of notches 20 only superficially, so that access to ducts 18 remains possible through the opening that have been made in the lateral walls of module 10 while notches 20 were being machined. The selectively obturation of the extremity of module 10 is thus achieved, since ducts 14 are effectively obturated, whereas access to ducts 18 remains possible through lateral notches 20. By way of illustration, it will be noted that the thickness of the layer of material 26 deposited by spraying as illustrated in FIG. 2, can be between 1.5 mm and 2 mm.

According to a second variant of the invention, the first step of forming notches is removed and replaced by a step following the step of obturating the ducts by spraying a material in a liquid state, which remains unchanged but is then applied to a module with a flat end. This new step consists in machining off the layer of material deposited by schooping on the rows of ducts which should open at the end of the module. Preferentially, the machining is performed by electroerosion or by means of a laser.

According to a third variant of the invention, the step of forming notches is also removed and replaced by the location of masks in front of those rows of ducts which should open at the end of the module, during the step of obturating this end by spraying a material in a liquid state. When the masks are withdrawn, free access to these rows of ducts is allowed, while the other rows are obturated.

The selective obturation of the extremities of module 10 according to the present invention is thus carried out in a particularly simple way, from a one-piece module obtained, e.g., by drawing, and said selective obturation permits to obtain a module suitable for various applications such as, e.g., heat-exchange between two fluids and ultrafiltration.

What is claimed is:

1. A method for selectively obturating at least one end of a structural module having rows of parallel first and second ducts for the passage of first and second fluids, respectively, said ducts being elongated and having open ends, said method comprising forming notches in portions of said at least one end of the module at locations corresponding with said first ducts, said notches providing openings through the lateral wall of the module which communicate with the first ducts, depositing an impervious material over said at least one end of the module, the step of depositing said impervious material including spraying the impervious material in a liquid state intermittently during projection periods separated by longer cooling periods, the impervious material being sprayed at an angle between 18° and 30° with respect to the elongated dimension of the ducts and onto the open ends of the ducts to obturate the second ducts and leave lateral free access to the first ducts.

2. A method according to claim 1, wherein said notches have a width substantially equal to inner width of said first and second ducts.

3. A method according to claim 1, wherein said notches are obtained by a machining operation.

4. A method according to claim 1, wherein said impervious material is selected from the group consisting of metal oxides, metals and mixtures thereof.

5. A method according to claim 1, wherein said impervious material is at least one member selected from the group consisting of alumina, aluminum and nickel.

6. A method according to claim 1, wherein said module is made of a metal or a ceramic material.

7. A method according to claim 1, wherein said module is made from a material selected from the group consisting of alumina, cordierite and nickel.

8. A method for selectively obturating at least one end of a structural module provided with rows of parallel first and second ducts for the passage of first and second fluids, respectively, said ducts being elongated and having open ends, said method comprising depositing an impervious material over the end of said module to obturate open ends of the ducts, the step of depositing said impervious material including spraying the impervious material in a liquid state intermittently during projection periods separated by longer cooling periods, the impervious material being sprayed at an angle between 18° and 30° with respect to the elongated dimension of the ducts and onto the end of the module to obturate the open ends of the first and second ducts, and machining the layer of impervious material deposited on the ends of the first ducts to provide access thereto.

9. A method according to claim 8, wherein said impervious material is at least one member selected from the group consisting of alumina, aluminum and nickel.

10. A method according to claim 8, wherein said module is made from a material selected from the group consisting of alumina, cordierite and nickel.

11. A method for selectively obturating at least one end of a structural module provided with rows of parallel first and second ducts for the passage of first and second fluids, respectively, said ducts being elongated and having open ends, said method comprising positioning a mask means over the open ends of the first ducts and depositing an impervious material over the end of the module with the mask means so positioned, the step of depositing said impervious material including spraying the impervious material in a liquid state intermittently during projection periods separated by longer cooling periods, the impervious material being sprayed at an angle between 18° and 30° with respect to the elongated dimension of the ducts and onto the end of the module to obturate the open ends of the second ducts, the mask means preventing obturation of the open ends of the first ducts.

12. A method according to claim 11, wherein said module is made from a material selected from the group consisting of alumina, cordierite and nickel.

* * * * *